United States Patent
Hendee

(10) Patent No.: US 6,991,403 B1
(45) Date of Patent: Jan. 31, 2006

(54) SYSTEM FOR ANCHORING FABRIC PANELS

(76) Inventor: Charles C. Hendee, 9350 S. Point Dr., Houston, TX (US) 77054

( * ) Notice: Subject to any disclaimer, the term of this patent is extended or adjusted under 35 U.S.C. 154(b) by 0 days.

(21) Appl. No.: 11/226,034

(22) Filed: Sep. 14, 2005

Related U.S. Application Data

(60) Provisional application No. 60/609,979, filed on Sep. 15, 2004.

(51) Int. Cl.
*E02B 3/16* (2006.01)
*E02B 7/00* (2006.01)

(52) U.S. Cl. .................. 405/114; 405/115; 24/460; 24/462

(58) Field of Classification Search ............ 405/115, 405/114; 24/460, 462
See application file for complete search history.

(56) References Cited

U.S. PATENT DOCUMENTS

| | | | | |
|---|---|---|---|---|
| 3,355,851 A | * | 12/1967 | Imbertson et al. | 405/115 |
| 3,811,454 A | * | 5/1974 | Huddle | 135/119 |
| 3,818,550 A | * | 6/1974 | Cresswell | 24/462 |
| 4,170,810 A | * | 10/1979 | Peleg | 24/462 |
| 4,887,626 A | * | 12/1989 | Dalo et al. | 135/119 |
| 5,645,373 A | | 7/1997 | Jenkins | 405/91 |
| 6,179,521 B1 | * | 1/2001 | Muramatsu et al. | 405/115 |
| 6,354,762 B1 | * | 3/2002 | Muramatsu | 405/115 |
| 6,692,188 B1 | | 2/2004 | Walker et al. | 405/115 |

* cited by examiner

*Primary Examiner*—Frederick L. Lagman
(74) *Attorney, Agent, or Firm*—Buskop Law Group, P.C.; Wendy Buskop

(57) ABSTRACT

A system for anchoring fabric panels having an anchor housing which includes, a base, walls on the ends of the base, a chamber, and an extension attached to the first wall, wherein the extension projects over the chamber. The system includes a key disposed in the chamber of the anchor housing adjacent to a wall, wherein the key comprises a locking edge, a chock disposed in the chamber adjacent to the key, wherein the chock has a locking edge that engages the locking edge of the key, a deformable tube disposed in the chamber of the anchor housing between the first wall and the chock and beneath the extension, and wherein a space is created between the tube and the extension. A fabric panel attached to a mooring which is located in the space, and wherein the fabric panel extends from the mooring and over the extension.

17 Claims, 4 Drawing Sheets

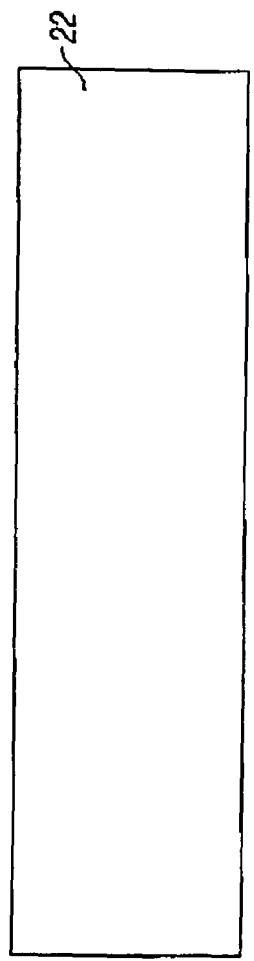
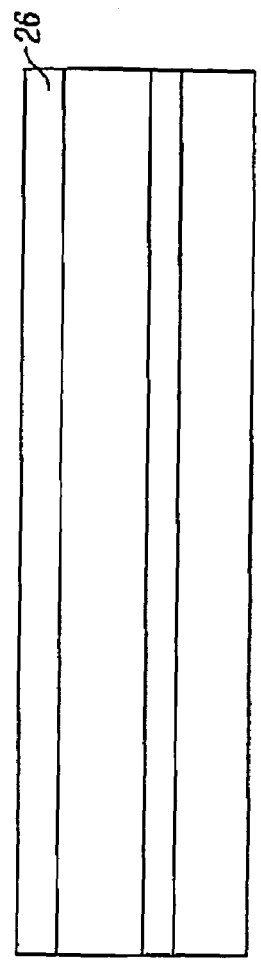
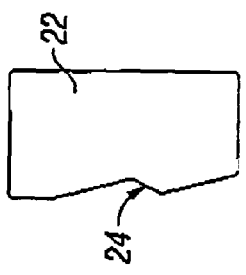
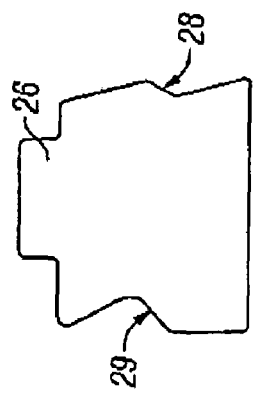
FIG. 3B
FIG. 4B
FIG. 3A
FIG. 4A

SYSTEM FOR ANCHORING FABRIC PANELS

CROSS REFERENCE TO RELATED APPLICATIONS

The present application claims priority to U.S. Provisional Patent Application Ser. No. 60/609,979 filed on Sep. 15, 2004.

FIELD

The present embodiments relate to systems for anchoring fabric panels. The present embodiments relate to anchor systems that allow for non-technical rapid deployment of flood barriers, wind barriers, and other fabric barrier products.

BACKGROUND

During adverse weather conditions heavy rain can lead to rivers and lakes overflowing causing flooding to the surrounding countryside. Coastline defenses can also be breached by increased sea swell and large waves. The main form of defense against such flooding is to build a physical barrier constructed from sand bags. Often little warning is given of flooding and the transport communications to remote locations can delay, or even prevent, the raw materials for sand bags being delivered in time.

Another situation where a fluid barrier is required at short notice is when a chemical or oil leak has occurred. In such cases, the spillage must be prevented from spreading into neighboring water supplies.

A barrier system can be required to prevent the flow of particle matter, such as snow or sand. A mass of small particles can move in a fluid-like manner. The movement of both snow and sand can have fluid characteristics. The barrier system is quick to erect and prevents the movement of such matter.

The continued development of terrain that is subject to flooding has heightened the need for temporary flood control barriers that can be easily transported, quickly erected at the desired site and then disassembled when the need for flood protection is relieved. High-yield crop land, for example, is typically found in the floodplains of significant rivers of the world. Although a substantial amount of such crop land is normally protected from flooding by permanent earth dikes or levees, such levees are often inadequate and are subsequently breached causing flooding of large areas of land that have various kinds of development thereon including residential and commercial structures, roadways, railroads, and virtually all forms of civilian development. Such development also takes place in flood prone areas that are not protected from flooding by permanent dikes or levees.

The time available to provide at least temporary flood protection for structural developments in flood prone areas may range from several hours to several days. For example, during the severe flooding of the Mississippi River floodplains in July 1993, predicted flood levels or "crests", particularly downstream of the source of flooding, were available several days prior to the critical flood period. In this case, attempts to protect many structures in floodplain areas behind the threatened levees or dikes were unsuccessful in that sand bag barriers or temporary earthen dikes or levees were quickly breached once the flood waters impinged on these structures. The permanent earthen levees or dikes were, in many cases, topped by the rising flood waters and efforts to increase the height of these levees using wooden planks, sand bags, or temporary sand or earth fill were largely unsuccessfully. Moreover, the erection of sand bag and earth fill barriers are extremely laborious, equipment intensive, and time consuming and such structures can rapidly become saturated and structurally weakened to the point of failure. Still further, earth fill barriers create a problem with respect to removal after the flood-waters have subsided.

Accordingly, the aforementioned continued development of floodplain and other flood prone areas has created a need for temporary flood control barriers that are easily transported and erected, and are not subject to structural weakening from water saturation, are not particularly laborious or equipment intensive, and can be removed and reused when needed.

The present embodiments meet these needs.

BRIEF DESCRIPTION OF THE DRAWINGS

The detailed description will be better understood in conjunction with the accompanying drawings as follows:

FIG. 3a depicts a side view of a key.
FIG. 3b depicts the top view of a key.
FIG. 4a depicts a side view of a chock.
FIG. 4b depicts the top view of a chock.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that it can be practiced or carried out in various ways.

The present embodiments are for systems for anchoring fabric panels. The novel embodiment provides a system for fast deployment. The system includes anchors that allows for non-technical rapid deployment of a flood barrier, a wind barrier, and other fabric barrier products.

The embodied systems include an anchor to capture the edge of the fabric. The anchor can be a flush mounted anchor with a hard rubber chock and a key. The anchor can support normal pedestrian and motor vehicle traffic.

The novel systems require only a wedging tool to remove the fabric edge and can use materials that are recyclable and reusable.

Figure 1:
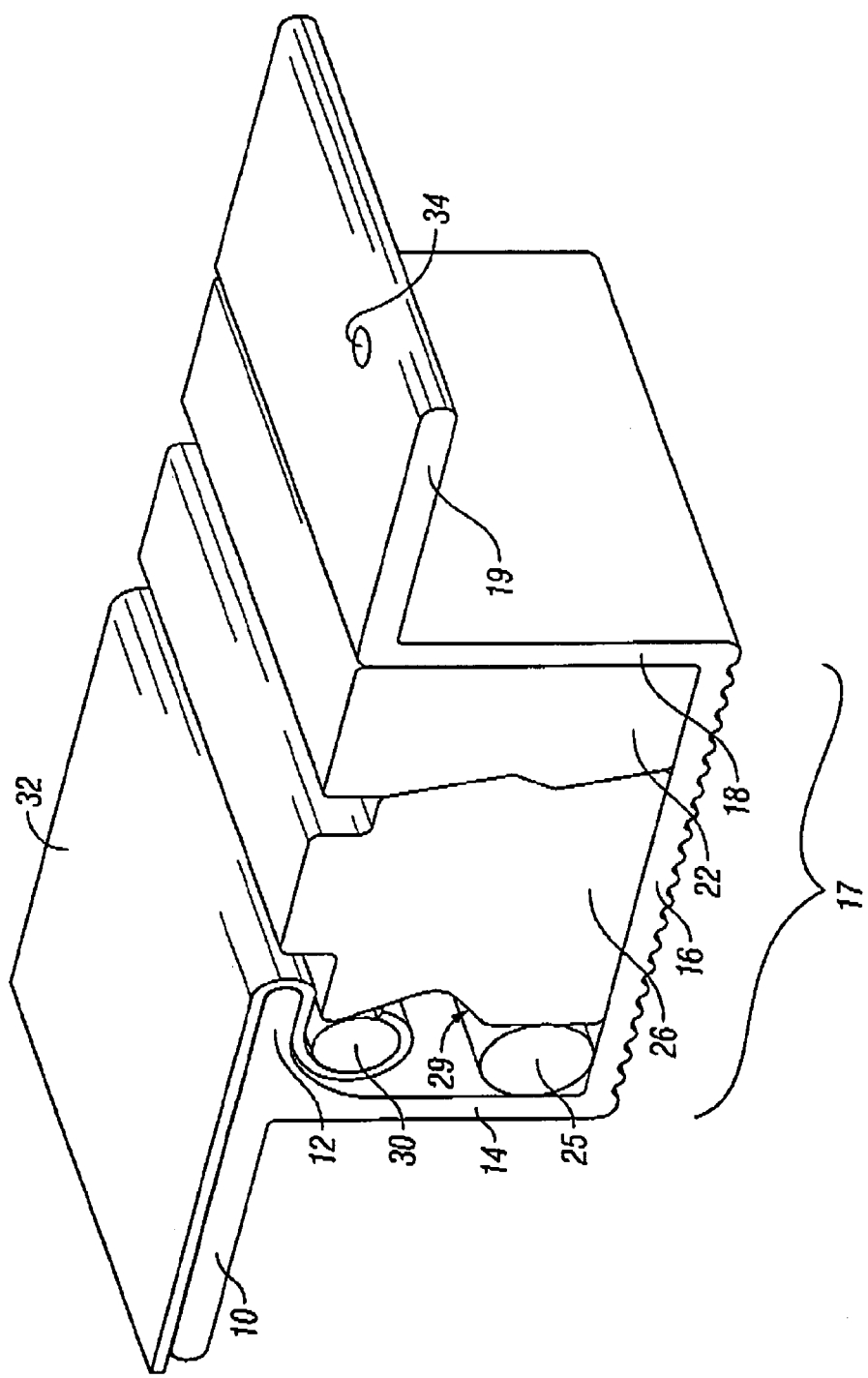
FIG. 1 depicts a perspective view of an embodiment of the system for anchoring fabric panels.

With reference to the figures, FIG. 1 is a perspective view of an embodiment of the system for anchoring fabric panels. The system utilizes one or more anchors to provide a fabric panel barrier in a specified location. The number of anchors used is dependent upon the length of fabric wall. An anchor can have a length ranging from between about 96 inches to about 120 inches. The anchor can be composed of any durable material, but the preferred materials to make the channel holding the fabric panel edge is aluminum, bronze, stainless steel, and alloys thereof. Each anchor is adapted to support up to about 2000 pounds per square inch without deforming.

The first arm 10 is attached to the first wall 14 and the second arm 19 is attached to the second wall 18. Each arm creates about a 90 degree angle with the respective wall. In another embodiment the first arm can form an angle that is less than 90 degrees from the first wall. Each wall 14 and 18 can be attached to a base 16. The second arm 19 has a hole 34 for attaching the anchor.

Each anchor includes an extension 12 attached to the first wall 14. The extension 12 projects over the chamber 17. The extension 12 extends over the chamber from between about 0.25 inches to about 3 inches.

The walls, arms, and extension can have a thickness from between about $3/16^{th}$ of an inch to about $3/8^{th}$ of an inch.

As additionally depicted in FIG. 1, the system includes a key 22, a chock 26, and a deformable tube 25. A fabric panel 32 is secured around a mooring 30 on one end, which can be a dowel. The fabric panel 32 can be removably disposed in the chamber 17. The mooring can be a flexible material or sturdy, but not rigid, so that when heavy water or high winds affect the fabric panel, the mooring can move without snapping.

A space 29 is created between the extension 12, the deformable tube 25, the first wall 14, and the chock 26. The deformable tube 25 is can be a closed cell polymer tube. The system includes a deformable tube 25 in the chamber 17 between the first wall and the chock. The deformable tube 25 is located in a space 29 beneath the extension 12 and the base 16, which forms a part of the chamber 17.

The deformable tube 25 can be composed of polystyrene, solid rubber, a compressible medium with memory to return to its original shape, or combinations thereof.

The system includes a fabric panel 32 attached to a mooring 30. The mooring 30 fits into the space 29 under extension 12. The fabric panel 32 extends from the mooring 30 and around the extension 12. The fabric panel 32 is then secured to the anchor and creates a barrier wall.

Figure 2A:
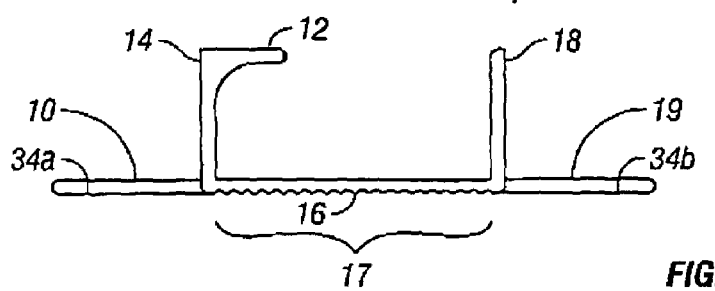
FIG. 2a depicts a side view of an anchor.
Figure 2B:
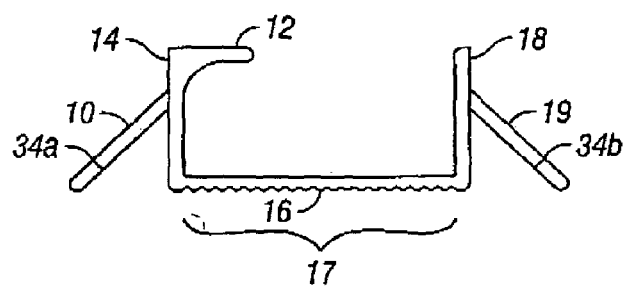
FIG. 2b depicts a side view of an anchor.
Figure 2C:
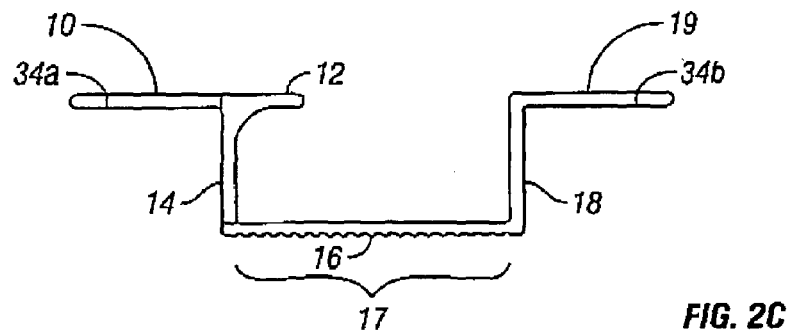
FIG. 2c depicts a side view of an anchor.
Figure 2D:
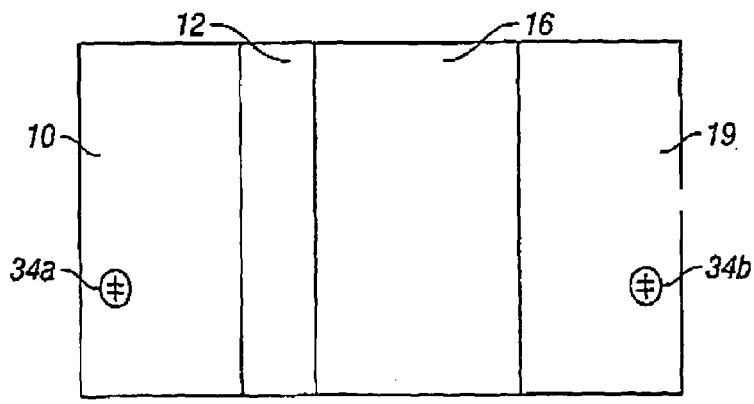
FIG. 2d depicts the top view of an anchor.

FIGS. 2a, 2b, and 2c depict side views of an anchor and FIG. 2d depicts a top view of an anchor. Each anchor has a base 16, a first wall 14, and a second wall 18. The first wall 14 and the second wall 18 are located on opposite ends of the base 16, effectively forming a chamber 17. The chamber 17 is typically a rectangular shape, but can also have a square shape, a trapezoidal shape, or other similar four-sided shapes. The extension 12 is attached to wall 14 and the arms 10 and 19 are attached to the walls 14 and 18.

The base 16 can have a width between about 2 inches to about 5 inches in length with the preferred width being 4 inches. Each wall 14 and 18 can have a height between 1 inches and four inches with the preferred height being 2 inches.

Each anchor includes two arms or plates that extend from each wall and project away from the chamber 17.

FIG. 2a shows an alternative embodiment wherein the arms 10 and 19 can be integral with the base 16 and extending in the same plane as the base 16. The embodiment makes fastening of the anchor to a concrete or other metal foundation much easier.

FIG. 2b depicts another embodiment, wherein the arms 10 and 19 can be formed to make an angle with an anchoring structure wherein the arms are secure to the walls at and angle of less than 30 degrees. The arms can be angled in order to satisfy fastening at a location where the anchor needs to be installed on a sloping grade.

FIGS. 2a, 2b, 2c and 2d depict that each arm can include a hole 34a and 34b in order to assist in the moving and installation of the anchor.

FIG. 3a depicts a side view of a key 22 and FIG. 3b depicts the top view of a key 22 which is usable in the invention. The key 22 is located adjacent to second wall 18 between the second wall 18 and the chock 26, which is not shown. The key 22 includes a first locking edge 24. The locking edge 24 is located at a distance of between about 20% to about 60% of the height of the key. As seen in FIG. 3a, the key 22 also comprises an angled shoulder for engaging the chock 26 as well as the locking edge. In one embodiment, the locking edge 24 can be beveled for ease of interlocking with the chock 26.

FIG. 4a depicts a side view of a chock 26. FIG. 4b depicts the top view of the chock 26. The chock 26 is located between the key 22 and the deformable tube 25 within the chamber, also not shown.

The chock 26 includes a second locking edge 28 that engages the first locking edge 24 located on the key 22. As seen in FIG. 4a, the chock 26 comprises a cutout on one side to engage the edge of the fabric panel around the mooring and a matching angled shoulder to engage the angled shoulder of the key 22.

Figure 5A:
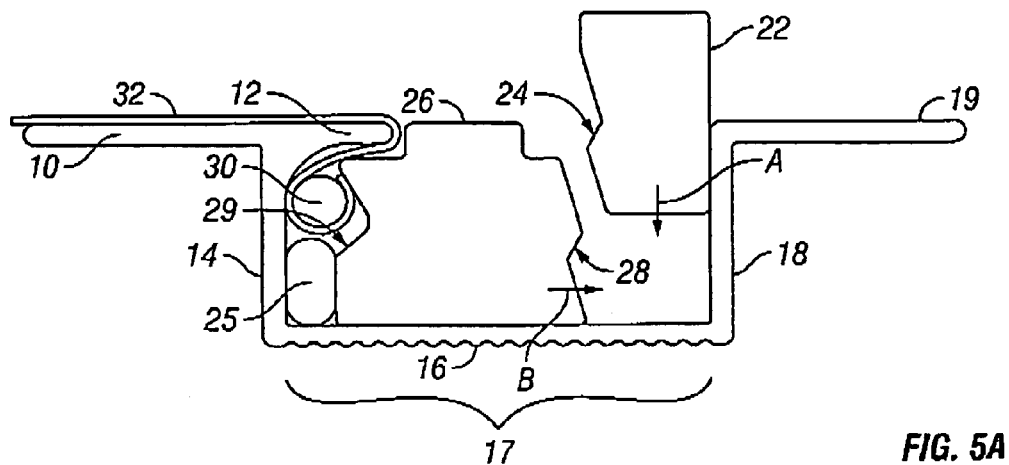
FIG. 5a depicts a side view of an embodiment of the system as deployed.
Figure 5B:
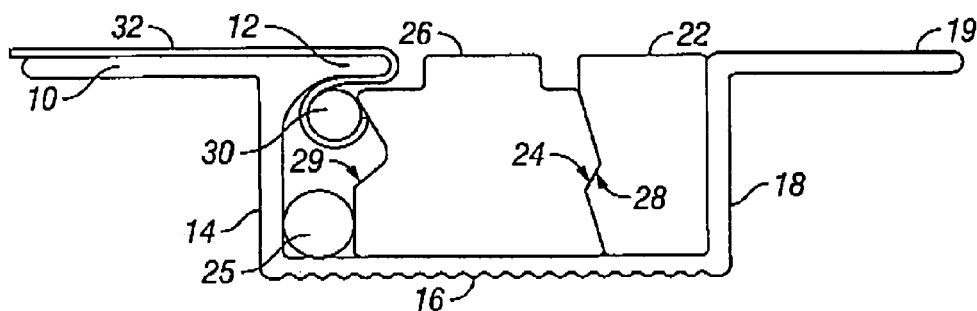
FIG. 5b depicts a side view of an embodiment of the system in the installation configuration.

FIG. 5a and FIG. 5b depict how the second locking edge 28 on the chock 26 engages the first locking edge 24 on the key 22 during installation.

The key 22 and the chock 26 can be composed of an extruded rubber or molded plastic, such as poly vinyl chloride and other polymers. In one embodiment, the key 22 can be more pliable than the chock 26, however, the key and the chock are both can be made of a hard plastic and the chamber can be lined with a metal. A laminate construction can be used to form the anchors, so as to reduce the possibility of lightening strikes or electrical discharge built up during storms.

Alternatively, the anchor can be made with the extension 12 being a hinge of bronze secured to the wall.

During installation, the chock 26 is forced against the deformable tube 25. The deformable tube 25 compresses to allow the chock 26 to slide over and allow the key 22 to be engaged in the chamber 17.

Once the key 22 is engaged, the deformable tube 25 presses against the chock 26 forming a tight engagement between the chock 26 and the key 22.

The deformable tube 25 can have a memory (or be composed of a material that reforms to an original shape) that allows the deformable tube 25 to return to an original shape. FIG. 5a depicts the deformable tube 25 in the original shape, while FIG. 5b depicts the deformable tube 25 compressed during installation.

The fabric panel 32 can be water resistant sheets, UV resistant sheets, mold resistant polymer sheets, or combinations thereof. The fabric panel 32 is a laminate of a woven fabric substrate on a non-woven flexible material or it can be a coated fabric, such as a polyvinyl chloride coating on a polyester substrate.

The mooring 30 that attaches to the fabric panel 32 can be a rod, a dowel, a block, or other similar anchor that will remain in the space 29 beneath the extension 12. The mooring can be a sack filled with a flowing solid, such as sand. The fabric panel 32 can be attached directly to the mooring 30 or an extension of the fabric panel can be sewn around the mooring 30 to secure the panel to the mooring.

FIG. 5a and FIG. 5b depict an anchor for rapid deployment of fabric panels. The anchors can attach to wood, be buried in the earth, or secured to a concrete foundation. The anchors are can be fastened to the concrete by bolting, but other fasteners, such as screws and adhesives can be used.

A deformable tube 25 is inserted into the chamber 17 near the first wall 14. The fabric panel 32 attached to a mooring 30 is inserted into the chamber 17 adjacent the deformable tube 25. The mooring 30 remains in the chamber 17 beneath the extension 12 and the fabric panel 32 itself extends over the extension 12 and away from the chamber 17.

In an embodiment, numerous anchors can share one fabric panel 32 with one mooring 30. The anchors can be attached to the concrete and located side by side. A separate deformable tube 32 can be inserted into each anchor. Alternatively, one tube and one fabric panel 32 can be used for multiple anchors. In still another embodiment, two or more fabric panels 32 can be joined and inserted into the anchor.

The chock 26 is inserted into the chamber 17 against the deformable tube 25. As the chock 26 is pressed against the deformable tube 25, the deformable tube 25 is compressed.

A key 22 is inserted into the chamber 17 between the chock 26 and the second wall 18, as depict by the arrow "A" in FIG. 5a. When the key 22 is inserted against the base 16, the deformable tube 25 presses against the chock 26, as depicted by the arrow "B" in FIG. 5a.

The anchor with the first arm 10, the extension 12, the chock 26, the key 22, and the second arm 19 can form a flush mounting that allows both automotive traffic and pedestrian traffic to pass over the anchor. The anchor supports weights up to about 2000 pounds per square inch without deforming.

Figure 6:
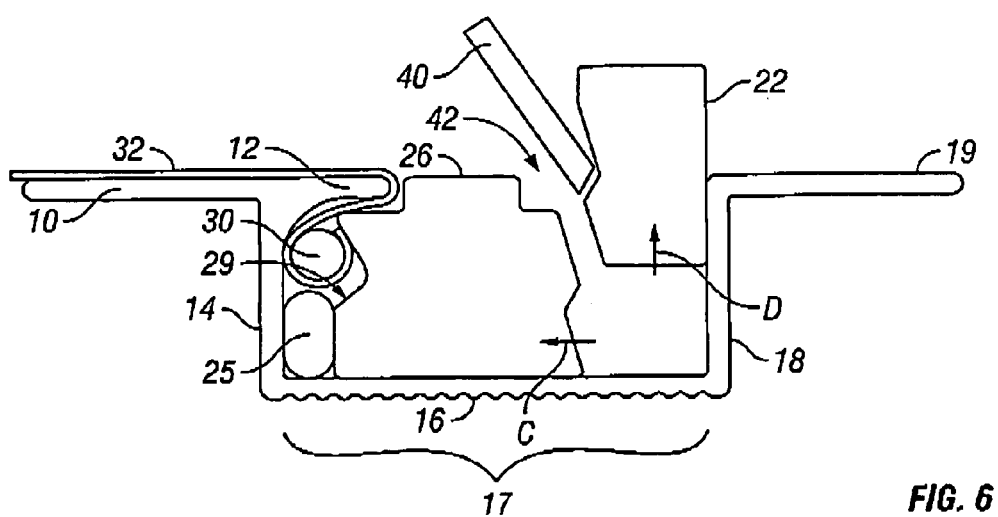
FIG. 6 depicts a side view of an embodiment of the system in the break down configuration.

FIG. 6 depicts a tool 40 to wedge into a gap 42 formed between the chock 26 and the key 22 to quick release the fabric. Using the tool 40, the chock 26 is pressed against the deformable tube 25 as depicted by arrow "C" in FIG. 6. The tool is levering against chock 26 allowing the release of key 22. The key 22 is then lifted from the chamber 17 as depicted by arrow "D" in FIG. 6. As the key is lifted from the chamber 17, the key 22 disengages from the chock 26. In succession, the key 22 is removed, the chock 26 is removed, the fabric panel 32 with mooring 30 is removed, and the deformable tube 25 is removed. The anchor can then be removed from the ground and transported to another location. The chock 26 does not have to be removed in order to remove the fabric panel 32.

While these embodiments have been described with emphasis on the preferred embodiments, it should be understood that within the scope of the appended claims, the embodiments might be practiced in ways other than as specifically described herein.

What is claimed is:

1. A system for anchoring fabric panels comprising:
   a. an anchor housing comprising:
      i. a base;
      ii. a first wall and a second wall disposed on opposite ends of the base, wherein the base, the first wall and the second wall form a chamber;
      iii. a first arm attached to the first wall, wherein the first arm projects away from the chamber;
      iv. a second arm attached to the second wall, wherein the second arm projects away from the chamber; and
      v. an extension attached to the first wall, wherein the extension projects over the chamber; and
   b. a key removably disposed in the chamber of the anchor housing adjacent to the second wall, wherein the key comprises a first locking edge;
   c. a chock removably disposed in the chamber of the anchor housing adjacent to the key, wherein the chock comprises a second locking edge that engages the first locking edge;
   d. a deformable tube removably disposed in the chamber of the anchor housing between the first wall and the chock and beneath the extension, and wherein a space is created between the tube and the extension; and
   e. a fabric panel attached to a mooring is located into the space beneath the extension, and wherein the fabric panel extends from the mooring and over the extension, forming a locking engagement.

2. The system of claim 1, wherein each anchor is composed of a material selected from the group consisting of aluminum, bronze, stainless steel, alloys, and combinations thereof.

3. The system of claim 1, wherein each anchor is adapted to support up to 2000 pounds per square inch without deforming.

4. The system of claim 1, wherein the base has a width between about 2 inches and about 5 inches.

5. The system of claim 1, wherein the first arm forms an angle that is less than 90 degrees from the first wall.

6. The system of claim 1, wherein the walls and arms comprise a thickness between $3/16^{th}$ of an inch to $3/8$ of an inch.

7. The system of claim 1, wherein the chamber comprises a rectangular shape.

8. The system of claim 1, wherein the extension comprises a length between about 0.25 inches and about 3 inches from the first wall.

9. The system of claim 1, wherein the key and the chock are composed of an extruded rubber, and wherein the key is more pliable than the chock.

10. The system of claim 1, wherein the key comprises an angled shoulder for engaging the chock, wherein the chock comprises a cutout on one side to engage the edge of the fabric panel and a matching angled shoulder on another side to engage the angled shoulder of the key.

11. The system of claim 1, wherein the deformable tube is a closed cell polymer tube.

12. The system of claim 1, wherein the deformable tube is composed of polystyrene, solid rubber, a compressible medium, or combinations thereof.

13. The system of claim 12, wherein the deformable tube comprises a memory material to allow the tube to return to an original shape.

14. The system of claim 1, wherein the fabric panel is water resistant sheets, UV resistant sheets, mold resistant polymer sheets, or combinations thereof.

15. The system of claim 14, wherein the fabric panel is a laminate of a woven fabric substrate on a non-woven flexible material.

16. The system of claim 1, wherein the mooring is a rod, a sack filled with a solid, a block, a dowel, or combinations thereof.

17. The system of claim 1, further comprising a hole disposed in the first arm to aid in moving the anchor.

* * * * *